United States Patent
Fraser et al.

(10) Patent No.: US 9,827,547 B2
(45) Date of Patent: Nov. 28, 2017

(54) MULTI-COMPARTMENT REACTOR AND METHOD FOR CONTROLLING RETENTION TIME IN A MULTI-COMPARTMENT REACTOR

(71) Applicant: Hatch Ltd., Mississauga (CA)

(72) Inventors: Kevin S. Fraser, Mississauga (CA);
Murray S. Pearson, Oakville (CA);
William E. McCombe, Georgetown (CA)

(73) Assignee: HATCH LTD., Mississauga, Ontario (CA)

( * ) Notice: Subject to any disclaimer, the term of this patent is extended or adjusted under 35 U.S.C. 154(b) by 709 days.

(21) Appl. No.: 13/972,439

(22) Filed: Aug. 21, 2013

(65) Prior Publication Data

US 2015/0050188 A1 Feb. 19, 2015

Related U.S. Application Data

(63) Continuation of application No. PCT/CA2013/050629, filed on Aug. 15, 2013.

(51) Int. Cl.
*B01F 7/16* (2006.01)
*H01M 4/58* (2010.01)
(Continued)

(52) U.S. Cl.
CPC ....... *B01J 19/0033* (2013.01); *B01J 19/0006* (2013.01); *B01J 19/006* (2013.01);
(Continued)

(58) Field of Classification Search
CPC .................................................. B01J 19/0033
See application file for complete search history.

(56) References Cited

U.S. PATENT DOCUMENTS

| 748,662 A | 1/1904 | Sebillot |
| 1,413,724 A | 4/1922 | Groch |

(Continued)

FOREIGN PATENT DOCUMENTS

| AU | 2004285993 B2 | 5/2005 |
| AU | 2007258886 B2 | 12/2007 |

(Continued)

OTHER PUBLICATIONS

"Final Results From Farallon's Metallurgical Test Program Confirm Precious Metals Recoveries for Campo Morado", available at farallonresources.com/i/pdf/FAN_2005-12-15_NR.pdf, Dec. 15, 2005, 7 pages.

(Continued)

*Primary Examiner* — Kathryn Wright
(74) *Attorney, Agent, or Firm* — K&L Gates LLP

(57) ABSTRACT

A method is disclosed for controlling retention time in a reactor, such as an autoclave, having a plurality of compartments separated by dividers with underflow openings. A retention time of the reaction mixture is calculated and compared with an optimal retention time, and the volumes of the reaction mixture in the compartments are adjusted while maintaining the flow rate of the reaction mixture, so as to change the retention time to a value which is closer to the optimal retention time. The reactor may include a level sensor in the last compartment for generating volume data; a control valve for controlling the liquid level in the last compartment; and a controller which receives volume data from the level sensor and controls operation of the control valve.

15 Claims, 3 Drawing Sheets

(51) Int. Cl.
*B01J 19/00* (2006.01)
*B01J 19/18* (2006.01)

(52) U.S. Cl.
CPC .......... *B01J 19/0066* (2013.01); *B01J 19/18* (2013.01); *B01J 19/1862* (2013.01); *B01J 2219/002* (2013.01); *B01J 2219/00166* (2013.01); *B01J 2219/00182* (2013.01); *B01J 2219/00213* (2013.01); *B01J 2219/00236* (2013.01); *B01J 2219/00768* (2013.01); *B01J 2219/182* (2013.01)

(56) References Cited

U.S. PATENT DOCUMENTS

| | | | |
|---|---|---|---|
| 2,646,346 | A | 7/1953 | Coplan et al. |
| 2,679,982 | A | 6/1954 | Thyle |
| 2,845,936 | A | 8/1958 | Boynton et al. |
| 2,871,116 | A | 1/1959 | Clark |
| 2,935,513 | A * | 5/1960 | Takeba ............... C07D 213/10 422/618 |
| 3,255,161 | A * | 6/1966 | Cobb, Jr. ............ B01J 19/0006 137/4 |
| 4,374,101 | A | 2/1983 | Lussiez et al. |
| 4,399,109 | A | 8/1983 | Iler et al. |
| 4,415,542 | A | 11/1983 | Queneau et al. |
| 4,578,163 | A | 3/1986 | Kunter et al. |
| 4,606,763 | A | 8/1986 | Weir |
| 4,738,718 | A | 4/1988 | Bakshani et al. |
| 4,834,793 | A | 5/1989 | Schneider et al. |
| 4,865,825 | A | 9/1989 | Chantriaux et al. |
| 4,979,987 | A | 12/1990 | Mason et al. |
| 5,071,477 | A | 12/1991 | Thomas et al. |
| 5,078,786 | A | 1/1992 | Peters et al. |
| 5,223,024 | A | 6/1993 | Jones |
| 5,286,457 | A | 2/1994 | Woodson et al. |
| 5,352,421 | A | 10/1994 | Smith et al. |
| 5,413,765 | A | 5/1995 | Smith et al. |
| 5,489,326 | A | 2/1996 | Thomas et al. |
| 5,500,135 | A | 3/1996 | Smith et al. |
| 5,520,818 | A | 5/1996 | Smith et al. |
| 5,527,475 | A | 6/1996 | Smith et al. |
| 5,535,992 | A | 7/1996 | Krause |
| 5,536,297 | A | 7/1996 | Marchbank et al. |
| 5,536,480 | A | 7/1996 | Simmons |
| 5,575,981 | A | 11/1996 | Krause |
| 5,585,005 | A | 12/1996 | Smith et al. |
| 5,599,507 | A | 2/1997 | Shaw et al. |
| 5,628,431 | A | 5/1997 | Roach et al. |
| 5,698,170 | A | 12/1997 | King |
| 5,986,133 | A | 11/1999 | Holtzapple et al. |
| 6,183,706 | B1 | 2/2001 | King |
| 6,299,776 | B1 | 10/2001 | McWhirter et al. |
| 6,368,381 | B1 | 4/2002 | King et al. |
| 6,395,063 | B1 | 5/2002 | Cole |
| 6,576,041 | B2 | 6/2003 | Cole |
| 6,641,642 | B2 | 11/2003 | Simmons et al. |
| 6,660,059 | B2 | 12/2003 | Ji et al. |
| 7,066,983 | B2 | 6/2006 | Ji et al. |
| 7,332,139 | B2 | 2/2008 | Schutte et al. |
| 7,604,783 | B2 | 10/2009 | King et al. |
| 7,820,445 | B2 | 10/2010 | Jarosch et al. |
| 7,829,031 | B2 | 11/2010 | Archibald et al. |
| 2002/0092377 | A1 | 7/2002 | Ji et al. |
| 2003/0136225 | A1 | 7/2003 | Simmons et al. |
| 2004/0188334 | A1 | 9/2004 | McWhirter et al. |
| 2004/0206207 | A1 | 10/2004 | Ji et al. |
| 2006/0133974 | A1 | 6/2006 | Ji et al. |
| 2007/0089566 | A1 | 4/2007 | Hackl et al. |
| 2007/0217285 | A1 | 9/2007 | Ji et al. |
| 2009/0019970 | A1 | 1/2009 | Ritchie et al. |
| 2010/0024603 | A1 | 2/2010 | Ji et al. |

FOREIGN PATENT DOCUMENTS

| | | |
|---|---|---|
| CA | 2646137 | 1/2012 |
| DE | 4336922 A1 | 5/1995 |
| GB | 1491651 | 11/1977 |
| GB | 1491851 | 11/1977 |
| JP | 2004-523341 | 8/2004 |
| JP | 2009-530077 | 8/2009 |
| WO | WO91/11539 | 8/1991 |
| WO | WO02/48046 A2 | 6/2002 |
| WO | WO02/070756 | 9/2002 |
| WO | WO03/060172 A2 | 7/2003 |
| WO | WO2005/042790 A1 | 5/2005 |
| WO | WO2007/143807 A1 | 12/2007 |
| WO | WO2007/144784 A2 | 12/2007 |
| WO | WO 2011/100830 A1 | 8/2011 |

OTHER PUBLICATIONS

Peacey et al., "Copper Hydrometallurgy—Current Status, Preliminary Economics, Future Direction and Positioning versus Smelting", available at http://www.hatch.ca/non_ferrous/articles/copper_hydrometallurgy.pdf, printed May 17, 2007, 18 pages.

Performance of a New Automatic Carbon Dioxide Coulometer; by E.W.D. Huffman, Jr., Microchemical Jr. 22, 1997, pp. 567-573.

Manual of Analytical Methods for the Uranium Concentrating Plant; by J.C. Ingles, Mines Branch Monograph 866, Mines Branch, Department of Mines and Technical Surveys, Ottawa, Canada, 1958, pp. 1-10.

The Sepon Copper Project: Development of a Flowsheet: by K. Baxter, D. Dreisinger and G. Pratt; vol. 2: Electrometallurgy and Environmental Hydrometallurgy, TMS (The Minerals, Metals & Materials Society), 2003, pp. 1487-1502.

Testing and Modelling a Novel Iron Control Concept in a Two-Stage Ferric Leach/Pressure Oxidation Process for the Sepon Copper Project; by K.G. Baxter, A.G. Pavlides, and D.G. Dixon, Pressure Hydrometallurgy 2004, 34th Annual Hydrometallurgy Meeting, Banff, Alberta, Canada, pp. 57-76. fl.

Increasing the Capacity of Existing and New Exothermic Autoclave Circuits; by G.M. Dunn and H.W. Scriba, Pressure Hydrometallurgy 2004, 34the Annual Hydrometallurgy Meeting, Banff, Alberta, Canada, pp. 425-444.

High Temperature POX of Precious/Base Metal Concentrates From Newmont's Phoenix Project, Using Controlled Precipitation of Sulphate Species to Enhance Silver Recovery; by G.L. Simmons and J.C. Gathje, Pressure Hydrometallurgy 2004, 34th Annual Hydrometallurgy Meeting, Banff, Alberta, Canada, pp. 735-750.

Gold & Resource Developments Macraes Gold Project Pressure Oxidation Plant Designed and Constructed by Minproc; MGP Tech Flyer 3, pp. 1-5.

Design & Commissioning of the Macraes Pressure Oxidation Circuit; by T. Giraudo, M.D. Cadzow, D.J. Lunt and T.W. Quaife, paper presented at Randol, 2000, Vancouver, Canada, Apr. 2000, 11 pages.

Sage Mill Patent Turns Waste to Ore; by L.W. Cope, ESMJ, Jan. 1998, 6 pages.

Process Principles in Minerals and Materials Production; by P.C. Hayes, Hayes Publishing Co., 52 Dewar Terrace, Sherwood, Queensland, 4075, Australia, 5 pages.

EKATO Pamphlet; "Mixing Update for Gassing Applications: EKATO's Self-Aspirating Impeller System"; 2 pages, which is believed to have been published in 1997.

J.E. Dutrizac, "Converting Jarosite Residues into Compact Hematite Products", JOM, Jan. 1990, pp. 36-39.

J. Geldart, C.J. Ferran, C.A. Fleming, "Hydrothermal Processing of Kidd Creek Jarosites for Stabilization and Metal Recovery", in Iron Control and Disposal Symposium, Ottawa, 1996, pp. 659-674.

W. Kunda, H. Veltman, "Decomposition of Jarosite", Metallurgical Transactions B, vol. 10B, Sep. 1979, pp. 439-446.

Weir, et al., "Precious metals recovery from pressure oxidized Porgera concentrates"; Minerals and Metallurgical Processing, Nov. 1986, 3 pages.

(56) References Cited

OTHER PUBLICATIONS

D. Adams, M. Preston, T. Post, P. Kubera, "Mixing Optimization of High Pressure Oxidation of Gold Ore Slurries", Randol Gold & Silver Forum '98, pp. 217-221.

David H. King, "Autoclave Design for Pressure Leaching of Laterites", 1996, 18 pages.

Robert J. Pett, "Bulong Nickel Project: Challenges of an Emerging Nickel Laterite", 1996, 10 pages.

Alan Taylor, "Engineering Issues & Economics of Pressure Leaching of Laterites", 1996, 19 pages.

G. Motteram et al., "Murrin Murrin Nickel/Cobalt Project", Apr. 1996, 31 pages.

Graham M. Fraser et al., "Agitator Design for Nickel Acid Leach Autoclaves", 1997, 10 pages.

Alan Taylor et al., "Technical Development of the Bulong Laterite Treatment Project", 1997, 57 pages.

Rodney Clary, "Autoclave Design Aspects for Pressure Leaching", 1998, 16 pages.

Peter A. Burger, "Implications of Geological and Mineralogical Aspects of Laterite Deposits for Metallurgical Plant Design", 1998, 15 pages.

J.H. Kyle et al., "Pilot Plant Testing of Nickel Laterites", 1998, 27 pages.

E. Krause et al., "Pressure Acid Leaching of Nickeliferous Laterite Ores", 1998, 41 pages.

David Burvill et al., "Engineering Aspects of the Cawse Nickel/Cobalt Laterite Project", 1999, 20 pages.

Gary L. Frampton et al., "Experiences During Early Commissioning of the Bulong Nickel Operation", 1999, 21 pages.

Chad J. Czerny et al., "An Investigation of Autoclave Scales Formed in Commercial Nickel Laterite Pressure Acid Leaching Operations", 2000, pp. 1-34.

Ronald Klepper P.E., "Laterite Feed Pulp Agitation", 2000, pp. 1-22.

Peter Mason and Malcolm Hawker, "Ramu Nickel Process Piloting", presented at ALTA, Perth, Australia, 1998, 40 pages.

\* cited by examiner

MULTI-COMPARTMENT REACTOR AND METHOD FOR CONTROLLING RETENTION TIME IN A MULTI-COMPARTMENT REACTOR

CROSS REFERENCE TO RELATED APPLICATIONS

This application is a continuation of International Application No. PCT/CA2013/050629, filed on Aug. 15, 2013, the contents of which are hereby expressly incorporated by reference into the detailed description hereof.

FIELD OF THE INVENTION

The invention relates to multi-compartment reactors and methods for their operation, and includes methods for controlling retention time in multi-compartment reactors.

BACKGROUND OF THE INVENTION

Multi-compartment reactors such as autoclaves are used in numerous chemical processes, and are commonly used in hydrometallurgical processes to recover metal values from aqueous slurries of ores or concentrates. For example, multi-compartment autoclaves are typically pressurized, cylindrical vessels having a plurality of fixed dividers separating adjacent compartments, with each compartment having an agitator and means for injecting an oxidizing gas into the stirred slurry.

As the slurry flows through the autoclave, it passes sequentially through each successive compartment until it reaches the last compartment, from which it is withdrawn as a product mixture for further processing. The slurry must have a sufficient residence or retention time in each compartment, and a sufficient overall retention time in the autoclave, to ensure that the chemical conversion is as complete as possible, in order to maximize metal recovery. The retention time in each individual compartment and the overall retention time in the autoclave are proportional to volume and inversely proportional to flow rate.

Autoclaves have traditionally been configured to permit cascading flow of slurry over the tops of the dividers. Autoclaves of this type are sometimes referred to herein as "overflow autoclaves". The dividers in an overflow autoclave are progressively decreased in height throughout the length of the autoclave to provide a head drop between adjacent compartments. The slurry level and volume of each compartment except the last compartment are fixed by the heights of the dividers. The flow rate is largely determined by the height of the head drop between the compartments, with some limited variability in flow rate being caused by fluctuations in the feed rate of slurry entering the autoclave. Therefore, the flow rate is substantially constant or fixed. While the liquid level in the last compartment can be controlled by varying the rate at which slurry is withdrawn from the autoclave, this is largely done to compensate for fluctuations in the slurry feed rate. Therefore, the retention time in an overflow autoclave is largely determined by fixed parameters of the autoclave, and cannot be varied or controlled in any significant way.

Autoclaves are also known in which the dividers are provided with openings below the level of the slurry (referred to herein as "underflow openings"), in order to permit at least some of the slurry to flow through, rather than over, the dividers. For example, some overflow autoclaves are provided with relatively small openings in the lower portions of the dividers in order to permit movement of coarse particles through the autoclave and avoid buildup of solids within the compartments. For example, the provision of underflow openings is common practice in nickel laterite processing to avoid the buildup and growth of coarse alunite particles in the autoclave compartments, thereby ensuring that the liquid and solid components of the slurry have a similar retention time distribution (RTD). However, in many such autoclaves the majority of the slurry flows over the tops of the dividers, and they are subject to the same limitations in control of retention time as the overflow autoclaves discussed above.

It is also known to provide autoclaves in which most or all of the slurry flows through the underflow openings in the dividers. In this type of autoclave (referred to herein as an "underflow autoclave"), most or all of the dividers extend above the level of the slurry in the compartments. One example of an underflow autoclave in which all the slurry flows through underflow openings in the dividers is disclosed by Adams et al., in a paper entitled "Mixing Optimization of High Pressure Oxidation of Gold Ore Slurries", presented at the 1998 Randol Gold & Silver Forum. Another example of an underflow autoclave is disclosed in Ji et al., US 2007/0217285 A1, published on Sep. 20, 2007. In Ji et al., all of the dividers may be configured to permit only through-flow of slurry, or the last divider may be configured for overflow of slurry to compensate for fluctuations in feed rate, as in the overflow autoclaves discussed above. Although Ji et al. discuss the beneficial impact of underflow dividers on RTD, both Adams et al. and Ji et al are silent with regard to control of retention time in an underflow autoclave.

Despite the fact that control of retention time in a multi-compartment autoclave can provide significant benefits in terms of process optimization, the prior art is silent as to how retention time control can be achieved in an autoclave, and certain aspects of autoclave design are incompatible with retention time control.

SUMMARY OF THE INVENTION

In one aspect, there is provided a method for controlling retention time of an aqueous reaction mixture in a reactor, comprising steps (a) to (e). Step (a) comprises providing the reactor, wherein the reactor comprises a plurality of compartments including a first compartment and a last compartment, and wherein each adjacent pair of the compartments is separated by a divider having at least one opening for flow of the reaction mixture. Step (b) comprises passing the aqueous reaction mixture through the reactor at a first flow rate, wherein the reaction mixture flows through the reactor from the first compartment to the last compartment, wherein a liquid level is defined in each of the compartments, wherein most or all of the reaction mixture flows between each adjacent pair of compartments by passing through the at least one opening in the divider separating the adjacent compartments, and wherein the at least one opening is below the liquid levels in the adjacent compartments. Step (c) comprises calculating a first retention time of the reaction mixture based on the first flow rate and on volumes of the reaction mixture in the compartments. Step (d) comprises comparing the first retention time with an optimal retention time of the reaction mixture. Step (e) comprises adjusting the volumes of the reaction mixture in the compartments while maintaining the first flow rate, so as to change the retention time from the first retention time to a second retention time which is closer to the optimal retention time.

In another aspect, there is provided a reactor, such as an autoclave operating at elevated temperature and pressure, having retention time control. The reactor comprises: a plurality of compartments including a first compartment and a last compartment; one or more dividers, each separating an adjacent pair of compartments; an inlet in the first compartment; an outlet in the last compartment; a level sensor in the last compartment for generating volume data; a control valve for controlling the liquid level in the last compartment; and a controller adapted to receive the volume data from the level sensor and for controlling operation of the control valve. Each of the dividers has at least one opening for flow of a reaction mixture therethrough. Each opening is located below a minimum liquid level in each of the adjacent pair of compartments, and each divider has a height which is greater than a maximum liquid level in each of the adjacent pair of compartments.

In the reactor and the method described above, the reaction mixture may be withdrawn from the reactor through an outlet tube located in the last compartment; the reaction mixture may be agitated as it flows through the reactor; and an oxygen-containing gas or fluid reagent (acid, caustic, or oxidant) may be injected into the reaction mixture as it flows through the reactor.

In the method, the aqueous reaction mixture may be an aqueous slurry of an ore or an ore concentrate containing one or more metal values. The aqueous reaction mixture may include amounts of solid and/or liquid components of the aqueous slurry which have already passed through the reactor, for example where it is desired to recycle one or more components of the reacted slurry back to the reactor. An example of a process where solids are recycled in an oxidative pressure leach is disclosed in International publication no. WO 2007/143907 A1 by Dreisinger et al. It will be appreciated that the composition of the slurry, including the presence or absence of recycled components, will vary from one process to another, and is not critical to the operation of the processes and apparatus disclosed herein.

In the reactor, each divider may be provided with at least one opening below the liquid level in the compartments which are separated by that divider. For example, all the openings in all the dividers may be below the liquid levels in all the compartments. Each divider may have a height which is greater than the liquid levels in the compartments which are separated by that divider, such that all of the reaction mixture passes through the openings in the dividers.

In the reactor, the control valve may control the liquid levels in all compartments by controlling a rate of withdrawal of the reaction mixture from the last compartment. The operation of the control valve may be controlled by the controller, which receives information regarding the liquid level in at least one of the compartments, for example from the level sensor.

In the reactor, the total area of the opening(s) in each divider is sufficient to permit flow therethrough of all or substantially all of the reaction mixture at a desired flow rate. Furthermore, the total area of the opening(s) in each divider is substantially the same.

BRIEF DESCRIPTION OF THE DRAWINGS

Specific embodiments of the invention will now be described, by way of example only, with reference to the accompanying drawings in which.

DETAILED DESCRIPTION

A multi-compartment reactor 10 and a method for controlling retention time in the reactor are now discussed below with reference to the drawings. In the following description, the reactor 10 is an autoclave for oxidative conversion of an ore or an ore concentrate containing one or more metal values, and the conversion may be exothermic or endothermic. An aqueous slurry of the ore/concentrate containing one or more metal values is referred to herein as the "reaction mixture". Also, the raw reaction mixture entering the first compartment of reactor 10 is sometimes referred to herein as the "feed stream" and the processed reaction mixture withdrawn from the last compartment of the reactor 10 is referred to herein as the "product mixture".

The reaction mixture may be alkaline or acidic and may be processed in reactor 10 at elevated temperature and pressure. It will be appreciated, however, that the reactor and method according to the invention can be applied to numerous chemical processes where a liquid reaction mixture, which may or may not include a solid component, is passed through a multi-compartment reactor, and wherein the reactor and/or the reaction mixture are maintained at elevated, ambient or low temperature and/or pressure.

Although the specific identity of the ore/concentrate, the metal values, the slurry composition and the reaction conditions is unimportant for the purpose of describing the invention, the reactor 10 is described below as a multi-compartment autoclave operating at elevated temperature and pressure, containing an acidic aqueous slurry of an ore and/or concentrate. The solid particles in the ore and/or concentrate may contain values of base metals, platinum group or precious metals in various forms. Specific base metal values include copper, nickel, cobalt, zinc, molybdenum and vanadium, which may be present in the ore/concentrate as either sulfides or oxides. Nickel ores processable in reactor 10 include nickel laterite ores. Specific precious metal values include gold, silver, platinum, palladium, niobium, and tellurium, which may be present in the ore/concentrate locked up within sulphide complexes or other base metal matrices.

Figure 1:
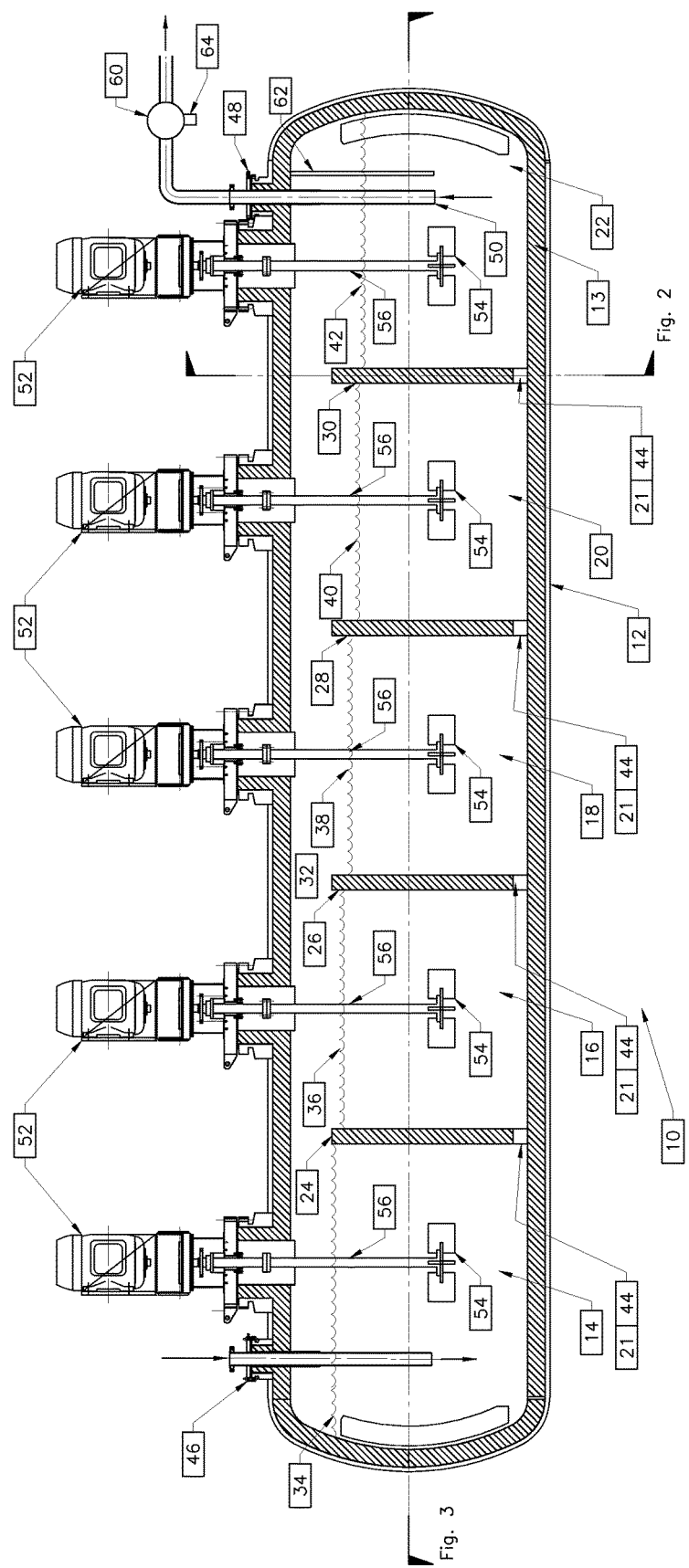
FIG. 1 is a partial cross section along a central longitudinal axis of a reactor according to an embodiment of the invention.
Figure 3:
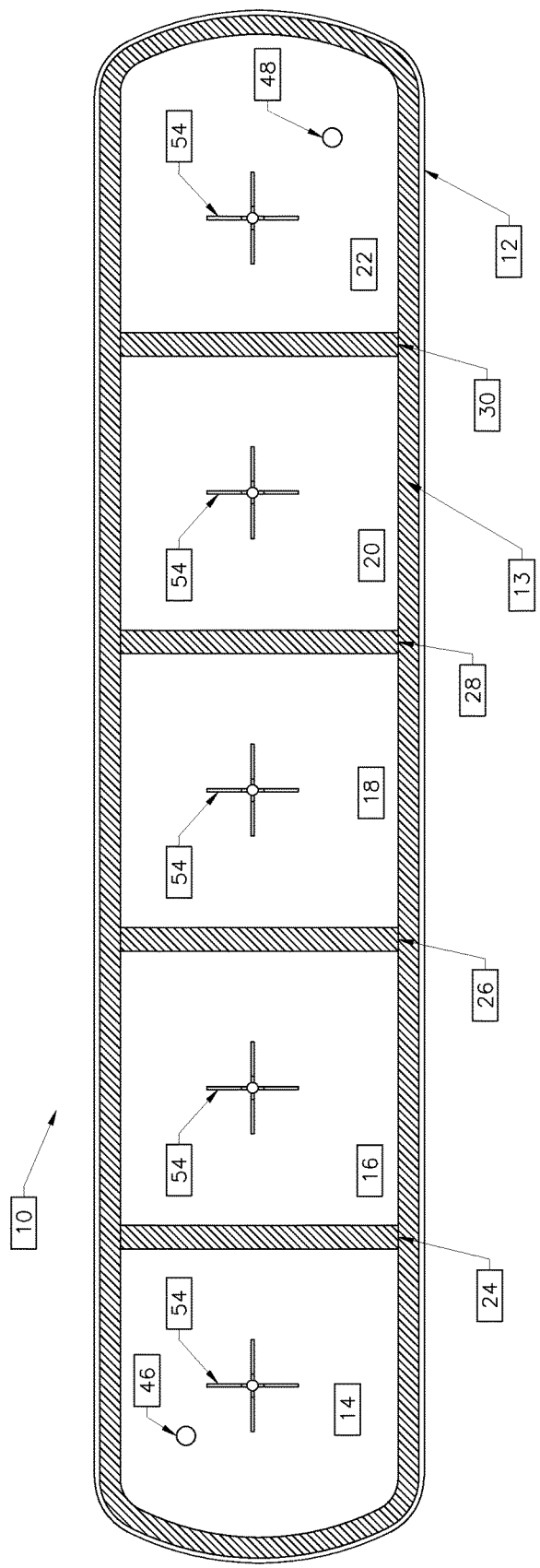
FIG. 3 is a cross-sectional top plan view of the reactor of FIG. 1.

Reactor 10 includes an outer wall 12, typically made of steel, which defines an elongate interior space. The inner surface of wall 12 may be provided with a refractory lining 13 which may be comprised of refractory bricks. The refractory lining 13 generally follows the shape of the outer wall 12, the lining 13 being provided to resist heat and corrosion. In the reactor 10 shown in the drawings, the outer wall 12 has an elongate, cylindrical shape with rounded ends which is typical of an autoclave for use at elevated temperature and pressure. However, the exact shape of the reactor 10 is variable, and is at least partly dependent on the process for which it is used. The reactor wall 12 defines a longitudinal axis A, which is shown in FIG. 1 as being collinear with the section line for FIG. 3, and which is parallel to the direction in which the slurry flows through the reactor 10.

The interior space of reactor 10 is divided into a plurality of compartments. In reactor 10 shown in the drawings, five compartments are defined, and these are labelled as 14, 16, 18, 20 and 22. Compartment 14 is the first compartment of reactor 10, into which the slurry is introduced as a feed stream through an inlet 46. Compartment 22 is the last compartment, and the reacted slurry is withdrawn from this compartment as a reaction product through an outlet 48. The remaining compartments 16, 18 and 20 are intermediate compartments located between the first and last compartments 14, 22.

Each adjacent pair of compartments in reactor 10 is separated by a divider, and therefore reactor 10 includes four dividers, and these are labelled as 24, 26, 28 and 30 in the drawings. The first divider 24 separates the first compartment 14 from the second compartment 16, second divider 26 separates the second compartment 16 from the third compartment 18, third divider 28 separates the third compartment 18 from the fourth compartment 20, and fourth divider 30 separates the fourth compartment 20 from the last compartment 22. Although reactor 10 includes a total of five compartments and four dividers, it will be appreciated that reactor 10 may comprise fewer or more compartments and dividers than are described herein.

Each of the dividers is in the form of a wall extending transversely across the interior of reactor, and having edges which are in sealed contact with the interior surface and/or inner lining 13 of wall 12. The dividers may comprise generally flat, planar metal plates having outer edges which follow the contours of the wall 12 and lining 13. The tops of the dividers are flat and spaced from the upper portion of inner lining 13 to provide a continuous head space 32 within the reactor 10.

Figure 2:
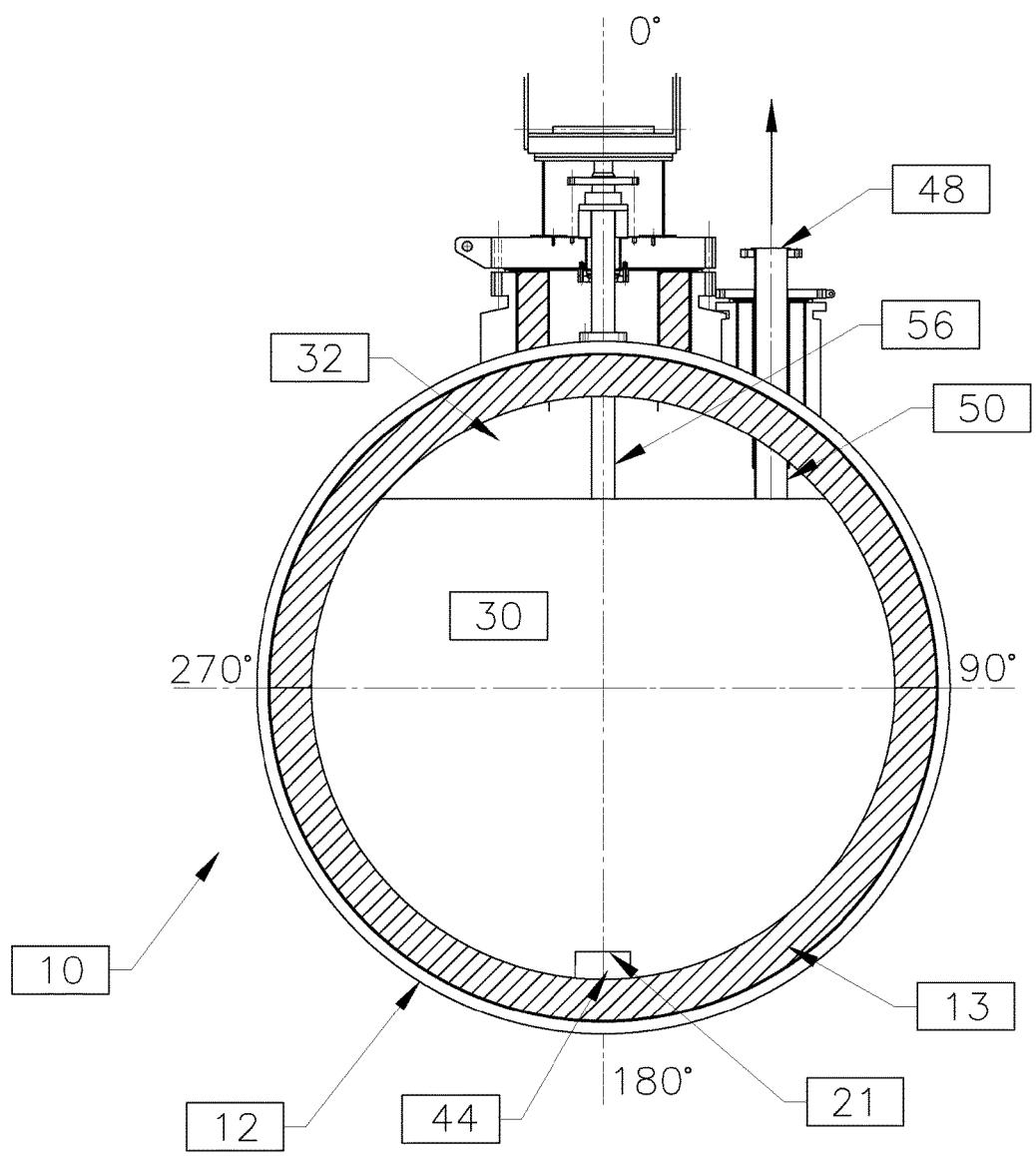
FIG. 2 is a transverse cross-sectional view of the reactor of FIG. 1.

A gap 21 is provided at the bottom of each divider 24, 26, 28, 30. The gaps 21 define underflow openings 44 through which solid and liquid components of the reaction mixture can flow between the compartments. In reactor 10 all of the dividers are provided with underflow openings 44. The underflow openings 44 in FIGS. 1 and 2 are centrally located in the dividers but, as discussed further below, this may not be the case with all embodiments of the invention.

Each of the dividers has a height, measured from the bottom of gap 21 to the flat top of the divider. The heights of the dividers are related to the liquid levels, i.e. the level of the reaction mixture, in the compartments. For reasons which are discussed below, the liquid levels in the compartments are different, and therefore they are identified herein by distinct reference numerals. In this regard, the liquid levels in compartments 14, 16, 18, 20 and 22 are identified by reference numerals 34, 36, 38, 40 and 42, respectively.

Reactor 10 illustrated in the drawings is configured as a 100% underflow autoclave, meaning that all of the reaction mixture flowing through reactor 10 passes through the underflow openings 44 between adjacent dividers, and none of the reaction mixture flows over the dividers during normal operation of the reactor 10. Therefore, the liquid levels 34, 36, 38, 40, 42 shown in the drawings represent maximum liquid levels, and the height of each divider, measured from the bottom of lining 13 to the flat top of the divider, is greater than the maximum liquid levels in the compartments which are separated by that divider. In this regard, the first divider 24 has a height which is greater than the maximum liquid levels 34, 36 in the respective first and second compartments 14, 16. The second divider 26 has a height which is greater than the maximum liquid levels 36, 38 in the respective second and third compartments 16, 18. The third divider 28 has a height which is greater than the maximum liquid levels 38, 40 in the respective third and fourth compartments 18, 20. Lastly, the fourth divider 30 has a height which is greater than the maximum liquid level 40, 42 in the respective fourth and fifth compartments 20, 22.

For simplicity, all of the dividers may have the same height, in which case each divider will have a height which is greater than the maximum liquid level in all of the compartments. However, in the illustrated embodiment, the dividers are of different heights, each having a height which is slightly greater than the maximum liquid level in the compartment which is immediately upstream of that divider. In this regard, the height of first divider 24 is slightly greater than the maximum liquid level in the first compartment 14, the height of second divider 26 is slightly greater than the maximum liquid level in the second compartment 16, the height of third divider 28 is slightly greater than the maximum liquid level in the third compartment 18, and the height of fourth divider 30 is slightly greater than the maximum liquid level in the fourth compartment 20.

As mentioned above, the liquid level in each compartment is different, and the liquid level in each compartment decreases from the first compartment 14 to the last compartment 22, as does the height of the dividers in the illustrated embodiment. The difference in liquid level between adjacent compartments is referred to herein as the head drop, and is related to the areas of the underflow openings 44. In particular, large underflow openings 44 are associated with a high flow rate and a low head drop, whereas small underflow openings 44 are associated with a larger head drop. According to the present invention, the head drop is desirably in the range from about 50 to about 150 mm, or from about 2 to about 6 inches. In one embodiment of the invention the head drop is from about 75 to about 150 mm, or from about 3 to about 6 inches. The head drop must be great enough to prevent backflow of the reaction mixture in reactor 10, but is not so great that the reaction mixture overflows the dividers. The inventors have found that a sufficient head drop between adjacent compartments can be achieved by providing all the dividers with underflow openings 44 having the same total area.

Where reactor 10 is a 100% underflow autoclave, all the openings 44 in the dividers are located below the minimum liquid levels in the compartments and must be of sufficient area to permit the reaction mixture to flow therethrough at a desired flow rate. Although the drawings show the openings 44 in the dividers being located proximate to the bottom of wall 12, and each of the dividers is provided with one opening 44, it will be appreciated that this is not necessarily the case. Rather, the dividers may have more than one opening 44, so long as the total area of the openings 44 in each divider is sufficient to permit the reaction mixture to flow therethrough at the desired flow rate. Also, the openings 44 can be located above the bottom of the compartment, so long as they are located below the minimum liquid levels in the compartments separated by the divider. For example, the openings 44 can be located from about 12 to about 24 inches above the bottom of the compartment.

Furthermore, although the underflow openings are shown in the drawings as being centrally located in the dividers this is not necessarily the case. For example, the underflow openings 44 may be displaced away from the centre of the dividers, and may for example be displaced toward the leeward side of the impellers 54 in order to minimize short-circuiting of flow in reactor 10.

Each compartment of reactor 10 is provided with at least one agitator 52 having an impeller rotating on a vertical shaft 56. The reaction mixture may be vigorously agitated so as to retain solid particles in suspension. The drawings show one agitator 52 per compartment, but it may be desired to two or more agitators in at least one of the compartments. The direction in which the impellers 54 rotate in adjacent compartments may be the same, or the direction of rotation may be reversed from compartment to compartment.

Each compartment may further be provided with sparger pipes (not shown) through which a gaseous or liquid reagent is injected into the reaction mixture. In the context of a process for oxidative conversion of an ore or an ore concentrate containing one or more metal values, the sparger pipes will inject a molecular oxygen-containing gas or an oxidizing liquid such as hydrogen peroxide into each compartment, for oxidation of metal-containing compounds in the reaction mixture.

As mentioned above, the reactor 10 has an inlet 46 through which the feed stream is introduced into the first compartment 14, and an outlet 48 at the opposite end of reactor 10 through which the product is withdrawn from the last compartment 22. Where the outlet 48 is provided in an upper portion of the reactor 10, the outlet 48 may be provided with a dip tube 50 which extends from the outlet 48 to below the liquid level 42 in the last compartment 22, to enable the reaction product to be withdrawn from the last compartment 22.

The feed stream may be introduced into the first compartment 14 on a continuous basis, and the product may be removed from the last compartment 22 on a continuous basis, thereby providing a continuous flow of slurry through the reactor 10. The rate of introduction of the feed stream and the rate of withdrawal of the reaction product are typically maintained as consistent as possible, subject to minor fluctuations in the feed rate, so as to maintain a substantially constant flow rate of slurry through the reactor 10.

The reactor 10 further comprises a control valve 60 to control the liquid levels in the compartments of reactor 10. The control valve 60 permits controlled withdrawal of a portion of the reaction mixture from reactor 10 so as to provide control over the liquid levels. In this regard, it can be seen that withdrawing a portion of the reaction mixture from one of the compartments in underflow reactor 10 will not only reduce the liquid level in the compartment from which the liquid is withdrawn, but will also bring about a reduction in the liquid levels in the other compartments. Therefore, by controlling the control valve 60, the liquid level within all of the compartments can be controlled.

The control valve 60 is in direct flow communication with one of the compartments of reactor 10. While control over the liquid level can be achieved by using valve 60 to control withdrawal of reaction mixture from any of the compartments, it is preferred that valve 60 is used to control the rate of withdrawal of the reaction mixture from the last compartment, to ensure that the liquid being removed has undergone sufficient reaction in reactor 10. Since an outlet 48 and dip tube 50 are already provided for withdrawal of the product mixture from the last compartment 22, the control valve 60 may conveniently be made to communicate with outlet 48 and dip tube 50, so as to permit variability in the rate at which the product mixture is withdrawn from the last compartment 22 through dip tube 50 and outlet 48. The control valve 60 may either be located inside or outside reactor 10, although it may be preferred to locate valve 60 outside of reactor 10 to avoid exposure of valve 60 to the corrosive atmosphere inside reactor 10. In an embodiment of the invention, the valve 60 is located in a flash tank (not shown) which is located downstream of reactor 10.

As will be appreciated, the volume of slurry in each compartment is determined by the liquid level in that compartment. Therefore, it is readily apparent that the use of control valve 60 to simultaneously vary the liquid levels in the compartments will have a direct impact on the volume of the reaction mixture in each compartment, and throughout the reactor 10 as a whole.

The retention time of reaction mixture in reactor 10 is a critical parameter which is desirably maintained as close as possible to an optimal retention time. For example, the retention time must be sufficient to allow the reaction mixture to react as completely as possible as it is converted from a feed stream to a product mixture, so as to maximize the recovery of metal values. The optimal retention time will vary somewhat during operation of reactor 10, depending on a number of factors, such as composition of the feed stream entering reactor 10, the rate of agitation, variations in the volumes of other components added to the reactor 10 such as quench water and/or recycled slurry. For each set of reaction conditions there will be an optimal retention time.

The inventors have recognized that it is beneficial to control the retention time of the slurry within reactor 10. This is distinct from the control of the retention time distribution (RTD) discussed in the above-mentioned patent application of Ji et al. As is already well known in the processing of nickel laterites, autoclaves with underflow openings provide better (i.e. narrower) RTDs than autoclaves with only overflow openings as they allow solid components of a slurry to flow through the autoclave at about the same rate as the liquid components. In contrast, controlling the retention time has the effect of increasing or reducing the overall or average retention time, without necessarily changing the RTD.

The inventors have also recognized that the retention time can be controlled independently of fixed reactor parameters such as reactor size and the area of openings 44. Thus, the inventors have discovered that it is possible to adjust the retention time without changing any of the reactor parameters. In particular, as discussed above, the retention time is proportional to the volume of slurry in reactor 10, and is inversely proportional to the flow rate of the slurry through reactor 10. Furthermore, since the level of slurry in all compartments of an underflow reactor can be controlled by varying the liquid level in one of the compartments, it is possible to control the volume, and therefore the retention time, by controlling the liquid level in one of the compartments. Since the flow rate is substantially constant and is typically varied only by external factors, such as fluctuations in the feed rate, and since the size of the autoclave and its compartments is pre-determined and fixed, variation in the liquid level within one of the compartments has a direct and predictable effect on the retention time.

In order to permit automatic adjustment of the liquid levels in the compartments, the reactor 10 may be provided with a liquid level sensor 62 located in one of the compartments. The sensor 62 generates information regarding the liquid level in one of the compartments, for example the last compartment 22, and transmits the information to valve 60. A controller 64 may also be provided to receive the level information from the sensor 62, calculate the retention time of reactor 10 and compare it with an optimal retention time, and then adjust operation of valve 60 to vary the rate at which the product mixture is withdrawn from the last compartment 22, and thereby modify the retention time to be closer to the optimal value.

In any given reactor the liquid levels in the compartments will be variable between a maximum level (eg. levels 34, 36, 38, 40, 42 in reactor 10) and a minimum level. The minimum level is determined, at least in part, by the heights of the impellers 54 and by the heights of the openings 44, i.e. the agitators must remain in contact with the reaction mixture and the openings 44 must be below the minimum liquid level to prevent short circuiting of the flow.

The reactor 10 shown in the drawings is configured for 100% underflow, i.e. all of the reaction mixture flows through the underflow openings 44 in the dividers as it passes from the first compartment 14 to the last compartment 22. It will be appreciated that the reactor 10 described herein may not necessarily have all dividers and compartments configured for 100% underflow. For example, the reactor 10 may be configured as a combination underflow/overflow reactor, in which a portion of the reaction mixture is permitted to flow over at least one of the dividers. However, regardless of whether or not reactor 10 is configured for 100% overflow, each of the dividers of reactor 10 is provided with underflow openings 44 which having sufficient total area such that a portion of the flow passes through the openings 44 in each the divider, and the areas of the openings 44 in all the dividers are such that a major portion of the flow through the reactor 10 is through openings 44 rather than over the tops of the dividers. For example, at least 80%, or at least 85%, or at least 90% by volume of the flow passes through the underflow openings 44 of reactor 10.

Although the invention has been described in connection with certain embodiments, it is not intended to be limited thereto. Rather, the invention includes all embodiments which may fall within the scope of the claims.

What is claimed is:

1. A method for controlling retention time of an aqueous reaction mixture in a reactor, the method comprising:
   (a) providing said reactor, wherein the reactor comprises a plurality of compartments including a first compartment and a last compartment, and wherein each adjacent pair of said compartments is separated by a divider having at least one opening for flow of the reaction mixture, wherein the at least one opening in each divider is located below a liquid level of the reaction mixture in the compartments which are separated by the divider;
   (b) providing a level sensor in one of the compartments, wherein the level sensor is configured to generate level information regarding the liquid level in said compartment:
   (c) providing a control valve to control the liquid level in the last compartment:
   (d) providing a controller which is configured to receive the level information from the level sensor, and to control operation of the control valve:
   (e) passing the aqueous reaction mixture through the reactor at a first flow rate, wherein the reaction mixture flows through the reactor from the first compartment to the last compartment, wherein most or all of the reaction mixture flows between each adjacent pair of said compartments by passing through the at least one opening in the divider separating the adjacent compartments;
   (f) generating the level information with the level sensor, and transmitting the level information to the controller; and
   (g) controlling operation of the control valve with the controller to vary a rate at which the product mixture is withdrawn from the last compartment so as to simultaneously adjust the liquid levels in all the compartments and thereby change the retention time.

2. The method according to claim 1, wherein the reactor has an inlet through which the first compartment receives the reaction mixture.

3. The method according to claim 1, wherein the reactor has an outlet through which the reaction mixture is withdrawn from the reactor.

4. The method according to claim 3, wherein the reaction mixture is withdrawn from the reactor through an outlet tube located in the last compartment.

5. The method according to claim 1, further comprising agitation of the reaction mixture as it flows through the reactor.

6. The method according to claim 1, further comprising injection of an oxygen-containing gas or liquid reagent into the reaction mixture as it flows through the reactor.

7. The method according to claim 1, wherein the reactor is an autoclave.

8. The method according to claim 1, wherein the aqueous reaction mixture is an aqueous slurry of an ore or an ore concentrate containing one or more metal values.

9. The method according to claim 1, wherein all of the openings in all of the dividers are below the liquid levels in all the compartments.

10. The method according to claim 1, wherein each said divider has a height which is greater than the liquid levels in the compartments which are separated by said divider, such that all of the reaction mixture passes through the openings in the dividers.

11. The method according to claim 1, wherein the controller is configured to calculate the retention time of the reaction mixture based on the first flow rate and the level information generated by the level sensor.

12. A reactor with retention time control, comprising:
   (a) a plurality of compartments, including a first compartment and a last compartment;
   (b) one or more dividers, each of said dividers separating an adjacent pair of said compartments, wherein each of the dividers has at least one opening for flow of a reaction mixture through the divider, and wherein each said opening is located below a minimum liquid level in each of said adjacent pair of compartments, wherein the divider has a height which is greater than a maximum liquid level in each of said adjacent pair of compartments, and wherein a continuous head space is provided within the reactor above the dividers;
   (c) an inlet in said first compartment;
   (d) an outlet in said last compartment;
   (e) a level sensor in said last compartment for generating volume data;
   (f) a control valve for controlling the liquid level in the last compartment; and
   (g) a controller configured to receive the volume data from the level sensor and for controlling operation of the control valve.

13. The reactor according to claim 12, further comprising at least one agitator in each of the compartments and means for injecting an oxidizing gas or liquid reagent into each of the compartments.

14. The reactor according to claim 12, wherein a total area of at least one opening in each of the dividers is sufficient to permit flow therethrough of all the reaction mixture.

15. The reactor according to claim 12, wherein a total area of at least one opening in each of the dividers is substantially the same.

* * * * *